US010133682B2

(12) United States Patent
Bhati et al.

(10) Patent No.: US 10,133,682 B2
(45) Date of Patent: Nov. 20, 2018

(54) MANAGING GROUPED STUDENT DEVICES WITH TIMED LOCKS

(71) Applicant: AIRWATCH LLC, Atlanta, GA (US)

(72) Inventors: Dheeraj Bhati, Bangalore (IN); Ashish Maan, Bangalore (IN)

(73) Assignee: AIRWATCH LLC, Atlanta, GA (US)

( * ) Notice: Subject to any disclaimer, the term of this patent is extended or adjusted under 35 U.S.C. 154(b) by 325 days.

(21) Appl. No.: 14/985,479

(22) Filed: Dec. 31, 2015

(65) Prior Publication Data

US 2017/0139845 A1    May 18, 2017

(30) Foreign Application Priority Data

Nov. 17, 2015    (IN) ........................... 6179/CHE/2015

(51) Int. Cl.
*G06F 12/14*    (2006.01)
*H04L 29/06*    (2006.01)
*H04W 12/08*    (2009.01)
*G06Q 50/20*    (2012.01)

(52) U.S. Cl.
CPC ........ *G06F 12/1466* (2013.01); *H04L 63/108* (2013.01); *H04W 12/08* (2013.01); *G06F 2212/1052* (2013.01); *G06Q 50/20* (2013.01); *H04L 63/107* (2013.01)

(58) Field of Classification Search
CPC ......... G06F 12/1466; G06F 2212/1052; H04L 63/108; H04L 63/107; H04W 12/08; G06Q 50/20

USPC .......................................................... 726/29
See application file for complete search history.

(56) References Cited

U.S. PATENT DOCUMENTS 8,166,164 B1 *    4/2012    Luna ..................... H04L 67/22
                                                                709/203
2017/0046966 A1 *    2/2017    Velasquez ................ G09B 7/02

* cited by examiner

*Primary Examiner* — Kambiz Zand
*Assistant Examiner* — Benjamin A Kaplan
(74) *Attorney, Agent, or Firm* — Clayton, McKay & Bailey, PC (57) ABSTRACT

Systems and methods presented here can allow a teacher to schedule the locking of one or more student devices into an asset at some time in the future. A teacher device can be used to configure lock information, including student identifying information, lock type information, asset information, and lock timing information. The lock information can be transmitted to the student devices for local storage. The lock can then initiate on the student device at the scheduled time even in instances when the student device is not connected to a communication network. After lock expiration, an updated asset can be stored at the student device in conjunction with lock confirmation information. When the student device detects a network connection, the updated asset and the lock confirmation information can be transmitted to a management server where it can be accessed and evaluated by the teacher.

20 Claims, 5 Drawing Sheets

MANAGING GROUPED STUDENT DEVICES WITH TIMED LOCKS

CROSS-REFERENCE TO RELATED APPLICATIONS

Benefit is claimed under 35 U.S.C. 119(a)-(d) to Foreign application Ser. No. 6179/CHE/2015 filed in India entitled "MANAGING GROUPED STUDENT DEVICES WITH TIMED LOCKS", on Nov. 17, 2015, by AIRWATCH LLC, which is herein incorporated in its entirety by reference for all purposes

BACKGROUND

Educational institutions, such as schools and universities, constantly seek ways to leverage technology to effectively educate their students. Some schools have attempted to utilize students' mobile devices (such as cell phones, tablets, and laptops) for portions of the learning experience due to the widespread proliferation of these devices. But mobile devices have also proven to be a distraction in a classroom or home environment, and in some cases, can be used as a tool for cheating.

Attempts to manage student devices in a classroom setting have been largely unsuccessful. In many educational settings, teachers ban mobile devices despite the potential efficiency benefits over pen and paper, because the potential distraction and cheating risks are too high. When an instructor pauses from teaching to request that a student turn off a ringing phone, this interrupts the flow of teaching and learning. Additionally, students can use their unmanaged mobile devices to access the Internet during a test or while performing a homework assignment at home to look up answers to questions.

Current technological solutions for limiting use of mobile devices in the classroom are largely device-specific applications that allow parents to place restrictions on their children's devices. But these solutions do not address the overarching problem of managing all the mobile devices amongst a group of students. Moreover, students often do not have access to reliable communication networks when they are at home or otherwise away from school. This is particularly true in less developed areas of the world. In such instances, current solutions do not allow for remotely managing a student's mobile device when it is away from school or not connected to a network.

A teacher's inability to assess students' attendance, participation, and performance when they are both in and away from the classroom, while simultaneously preventing students from being distracted by their devices or leveraging them to cheat, is a significant problem. Moreover, a system for managing a plurality of student devices in this fashion cannot be overly complex or cumbersome or a teacher will not make practical use of it.

Based on at least these problems, a need exists for systems that better manage mobile devices to enhance students' learning experiences, regardless of whether a student is in class, at home, or able to maintain a persistent connection to a communication network. Moreover, intuitive interfaces and workflows are needed for a teacher to make practical use of mobile device management systems.

SUMMARY

Examples described here include systems and methods for locking student devices into an asset, such as a document, file, application, or webpage, at a predetermined or future time. When locked into an asset, one or more functions of the student devices can be disabled. For example, when a student device is locked into a homework document, use of the device's messaging or web applications can be disabled. The locks can be initiated in a classroom environment or away from school, and regardless of whether a student device is connected to a communication network at the time of lock initiation.

In one example, a teacher can use a teacher device to configure a lock request. As used here, "teacher" is intended to include any teacher, instructor, professor, supervisor, or managing user. The lock request can include information identifying one or more students, student groups, or devices to which the lock will apply. The lock request can also include lock type information, asset information, and timing information. Lock types can include an application lock, a file lock, a web lock, or a lock profile with a combination of those lock types. An asset associated with the lock can depend upon the lock type. For example, assets associated with a file lock can be a document, a video file, or an audio file. Assets associated with a web lock can be one or more webpages.

The timing information associated with the lock request can include lock initiation information and lock expiration information. Lock initiation information can include a date and time at which a lock will be initiated. Alternatively, lock initiation information can include a window of time during which a student operating a student device can elect to initiate the lock, described here as a "dynamic" lock.

Lock expiration information can include a date and time at which the lock will expire or a period of time that begins upon lock initiation and ends at lock expiration. In other examples, lock expiration can be triggered by an event detected at a student device. Example expiration trigger events can include the selection of a "finished" or "submit" prompt, or the entering of information into one or more fields. In one example, lock expiration is triggered when global positioning signals indicate the student is no longer in a geographic location associated with the lock.

In some examples, a calendar application of the teacher device can be used to configure the lock. The calendar interface can include fields for selecting the lock information and parameters. Additionally, a lock event indicia can be displayed within a calendar corresponding to the date, time, and duration of a scheduled lock. This provides the teacher with an intuitive interface for scheduling locks and viewing all previously-scheduled locks at a glance.

After configuration, the lock request can be transmitted to a management server. Information within the request identifying one or more students can be used to identify associated student devices. One or more portions of the lock request can then be transmitted to the appropriate student devices in the form of a lock instruction. The lock instruction can include the lock type, the asset information, and the timing information.

Upon receipt, the student device(s) can store the information contained in the lock instruction locally. In this manner, even if a student device subsequently loses network connectivity, the lock can be initiated locally based on the locally stored lock instruction.

At the scheduled time, the lock can initiate and the student device can be locked into the asset. While other features of the student device can be disabled, a student can be permitted to access and engage with the locked asset. For example, where the asset is a test or homework assignment, the student can enter answers or other information into the document.

Upon expiration of the lock, the student device can prevent a student from further accessing or engaging with the asset. An updated version of the asset, including any information entered by the student while the lock was engaged, can be stored at the student device. The student device can also store confirmation information, including information indicating whether the lock was initiated successfully, whether the lock expired successfully, and to what extent a student engaged with a locked asset.

When the student device detects a network connection, the updated asset and the confirmation information can be transmitted back to the management server where it can be retrieved by the teacher using the teacher device. The teacher can interpret the updated asset and the confirmation information to assess the student's attendance, participation, or performance during the lock period and with respect to the locked asset.

It is to be understood that both the foregoing general description and the following detailed description are illustrative and explanatory only and are not restrictive of the examples, as claimed.

BRIEF DESCRIPTION OF THE DRAWINGS

The accompanying drawings, which are incorporated in and constitute a part of this disclosure, illustrate various examples and together with the description, serve to explain the principles of the disclosure. In the drawings.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Figure 1:
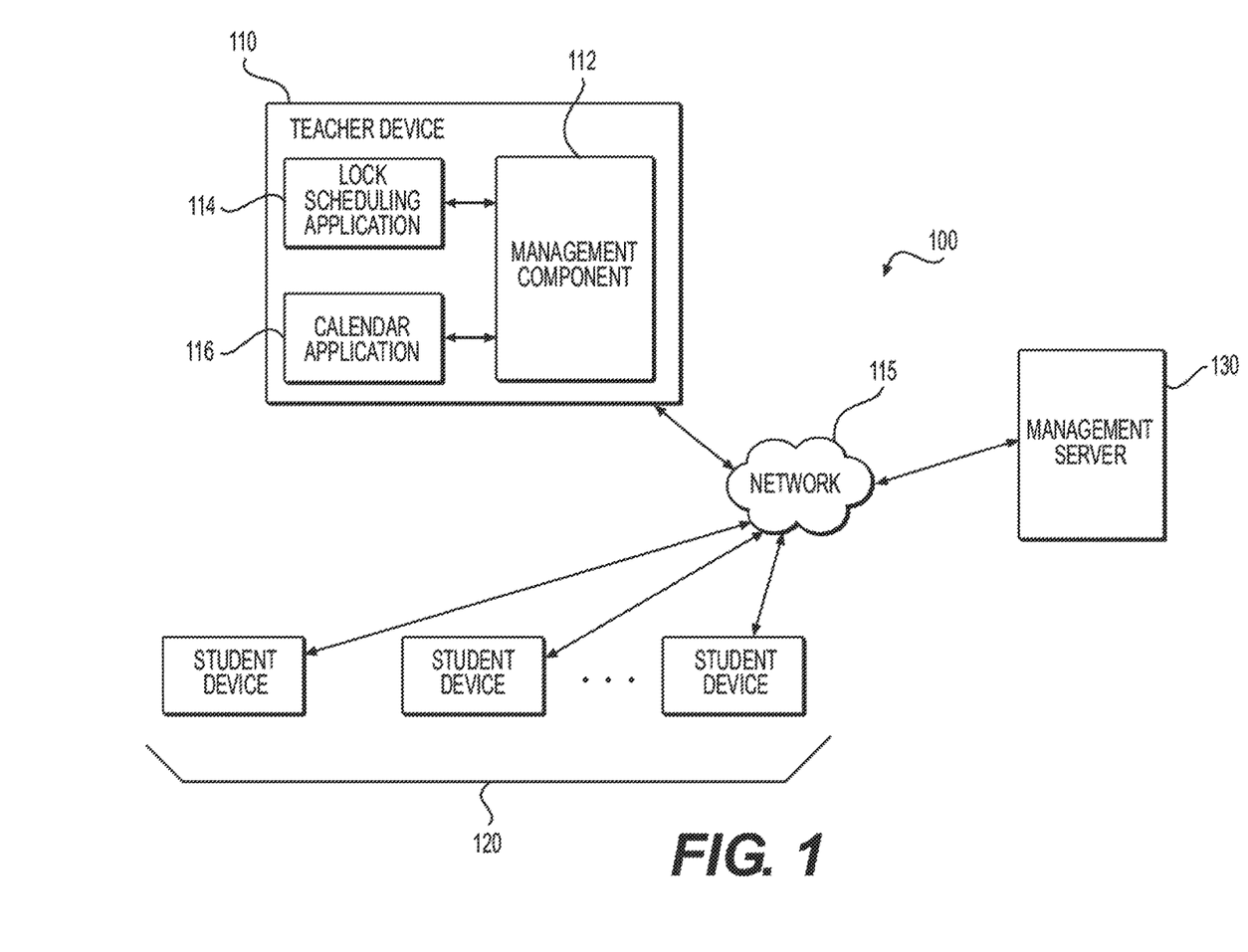
FIG. 1 is an illustrative system for managing one or more user devices.

FIG. 1 depicts an illustrative system 100 for managing the functionality of one or more student devices 120 from a teacher device 110. In one aspect, teacher device 110 can be used to lock student devices 120 into a particular application, file, or website at a predetermined time as part of a scheduled learning session. A learning session can be, for example, a class, test, or homework assignment. In some instances, student devices 120 can be locked into an application, file, or website even when the devices are not connected to a communication network at the scheduled time of the learning session.

Teacher device 110 and student devices 120 can be any computing device suitable for the purposes of this disclosure. For example, a computing device can be a cell phone, smart phone, tablet, laptop, personal computer, work station, or any other processor- or controller-based device for displaying, storing, receiving, or transmitting information.

Teacher device 110 and student devices 120 can also include a non-transitory, computer-readable medium containing instructions that can be executed by a processor of the device. Examples of a non-transitory, computer-readable medium include RAM and ROM, disks, other memory and storage that is accessible by a USB port, a floppy drive, CD-ROM, or DVD-ROM drive, and a flash drive, among others. Instructions contained at teacher device 110 can cause teacher device 110 to carry out stages necessary to communicate with student devices 120 and a management server 130. Similarly, instructions contained at a student device 120 can cause student device 120 to carry out stages necessary to communicate with teacher device 110 and management server 130.

In another aspect, teacher device 110 can execute managed applications, such as a lock scheduling application 114 and a calendar application 116. Teacher device 110 can also include a management component 112 for interacting with the managed applications and communicating with management server 130 over a network 115. As a result, management component 112 can enable management server 130 to send information to, and receive information from, the managed applications.

Student devices 120 can also include a management component 112 for communicating with management server 130 over network 115. Student devices 120 can be personal devices that include personal applications and data, but through use of management component 112, management server 130 can lock student devices 120 into applications, files, or websites as part of a learning session.

Management component 112 of teacher device 110 or student devices 120 can include a device-level component, such as an application programming interface (an "API"), agent application, hypervisor, or virtualized device. The management component can also include an application-level component, such as an API, SDK, application wrapper, or workspace agent application. The device-level management component can include system level privileges. The application-level management component can include privileges in managed applications that are signed or developed for operation with management server 130. Reference to the management component of either teacher device 110 or student devices 120 includes either or both of the device-level and application-level components unless otherwise specified. Thus, management server 130 can interact with the management component of teacher device 110 or student devices 120 with calls to and from an application or the operating system of the corresponding device.

Management server 130 can be responsible for storing associations between student devices 120 and a corresponding student or individual. Management server 130 can also store information associating students with classes in which the student is enrolled, one or more teachers associated with the classes, and any teacher devices associated with the classes. These relationships can be stored in a database that is part of, or accessed by, management server 130. As will be discussed in more detail below, management server 130 can also be responsible for coordinating and storing scheduled locks for files, applications, and web access, and facilitating the locking of student devices 120.

Network 115, over which teacher device 110, student devices 120, and management server 130 can communicate, can include any suitable communication network. For example, network 115 can include the Internet, a local area network, near-field communication channels, or any other suitable communication platform. Each of teacher device 110, student devices 120, and management server 130 can include an interface for communicating over network 115. Each interface can include one or more modulators, demodulators, multiplexers, demultiplexers, network communication devices, wireless devices, antennas, modems, and any other type of device configured to enable data communication through a communication network.

Each of teacher device 110, student devices 120, and management server 130 can utilize one or more processors. The term "processor," as generally used herein, can refer to any logic processing unit, such as one or more central processing units (CPUs), digital signal processors (DSPs), application specific integrated circuits (ASICs), field programmable gate arrays (FPGAs), and similar devices. The processor can include one or more processors, each configured to execute instructions and process data to perform one or more functions associated with system 100. The processor can be communicatively coupled to a RAM, ROM, storage, database, I/O module, or interface module. A processor can be configured to execute sequences of computer program instructions to perform various processes, which will be described in detail below. The computer program instructions can be loaded into RAM for execution by the processor.

Each of teacher device 110, student devices 120, and management server 130 can also include an I/O module, such as a touchscreen or a console with a keyboard and mouse to allow a user to input parameters associated with system 100. An I/O module can also include a display including a graphical user interface (GUI) for outputting information on a screen.

In one aspect, teacher device 110 can schedule a lock on student devices 120 by contacting management server 130 over network 115, such as the Internet, and transmitting a lock request. Management server 130 can also be in communication with student devices 120 over the same or a different network. Upon receiving the lock request from teacher device 110, management server 130 can utilize a management component of student devices 120 to transmit one or more messages to the student devices. This can cause student devices 120 to contact management server 130 for an instruction rather than maintaining an open socket with the management server 130.

A teacher using teacher device 110 can initiate a lock request on one or more student devices 120 using a managed application such as lock scheduling application 114 or calendar application 116. For example, using lock scheduling application 114, a teacher can input, select, or otherwise identify students or a predetermined group of students, such as all students enrolled in a particular class. In one example, selection or identification of students or a student group can be accomplished using a graphical user interface displayed on teacher device 110. Student identification can include selecting or providing one or more user identifiers. As used here, a "user identifier" can include information associated with a student, a group of students, a student device, or a group of student devices.

After one or more students or groups are identified, the teacher can select or identify a type of lock to apply to the corresponding student devices 120. The type of lock can include an application lock, a file lock, a web lock, or a lock profile with a combination of those lock types. The teacher can then select or identify one or more assets to which the lock type can apply. For example, an asset associated with an application lock can be one or more applications. An asset associated with a file lock can be one or more files, such as a text document, a video, or an image. An asset associated with a web lock can be one or more web addresses or domains.

In another aspect of configuring the lock request at teacher device 110, the teacher can select or input timing information associated with the lock request. In one example, the teacher can select or input a date and time to initiate the lock. The date and time can be configured as a one-time event or a recurring event, such as once per day, once per week, or once per year. Alternatively, the teacher can select or input a dynamic lock which, after student devices 120 have received the lock information (as discussed in more detail below), each student can initiate the lock at his or her respective student device 120 at a time of his or her choosing. In such an example, the teacher can also have the option of selecting an expiration date and time upon which the lock can automatically initiate if it has not been previously initiated at a student device by the respective student.

In addition to selecting initiation conditions for the lock, the teacher can also select or input lock expiration conditions. In one example, the lock can be configured to expire at a date and time. Alternatively, the lock can be configured to expire a predetermined amount of time after lock initiation, such as thirty minutes, two hours, or one day. In another example, the lock can be configured to expire upon the occurrence of a predetermined event at each student device 120. For instance, the lock can expire upon receipt at each student device 120 of one or more inputs associated with the locked asset. In this manner, a teacher can lock one or more student devices 120 into a homework assignment or test at a predetermined time or at a time chosen by each respective student (in the case of a dynamic lock) and the lock can expire upon that student completing the lecture, assignment, or test. Completion of a lecture can be determined based on the output of asset content, such as the completed display of a slide deck or video, or the completed playback of an audio file. Completion of an assignment or test can be determined based on the student device receiving an answer to every question presented to the student or receiving a "save" or "finish" command from the student at student device 120.

In other examples, a teacher can configure a lock request from calendar application 116. Similar to the stages described above with respect to lock scheduling application 114, the teacher can provide student (or group) identifying information, lock type information, asset information, and timing information. The timing information can include lock initiation information and lock expiration information. Calendar application 116 can include a graphical user interface for receiving the lock request information.

Figure 2:
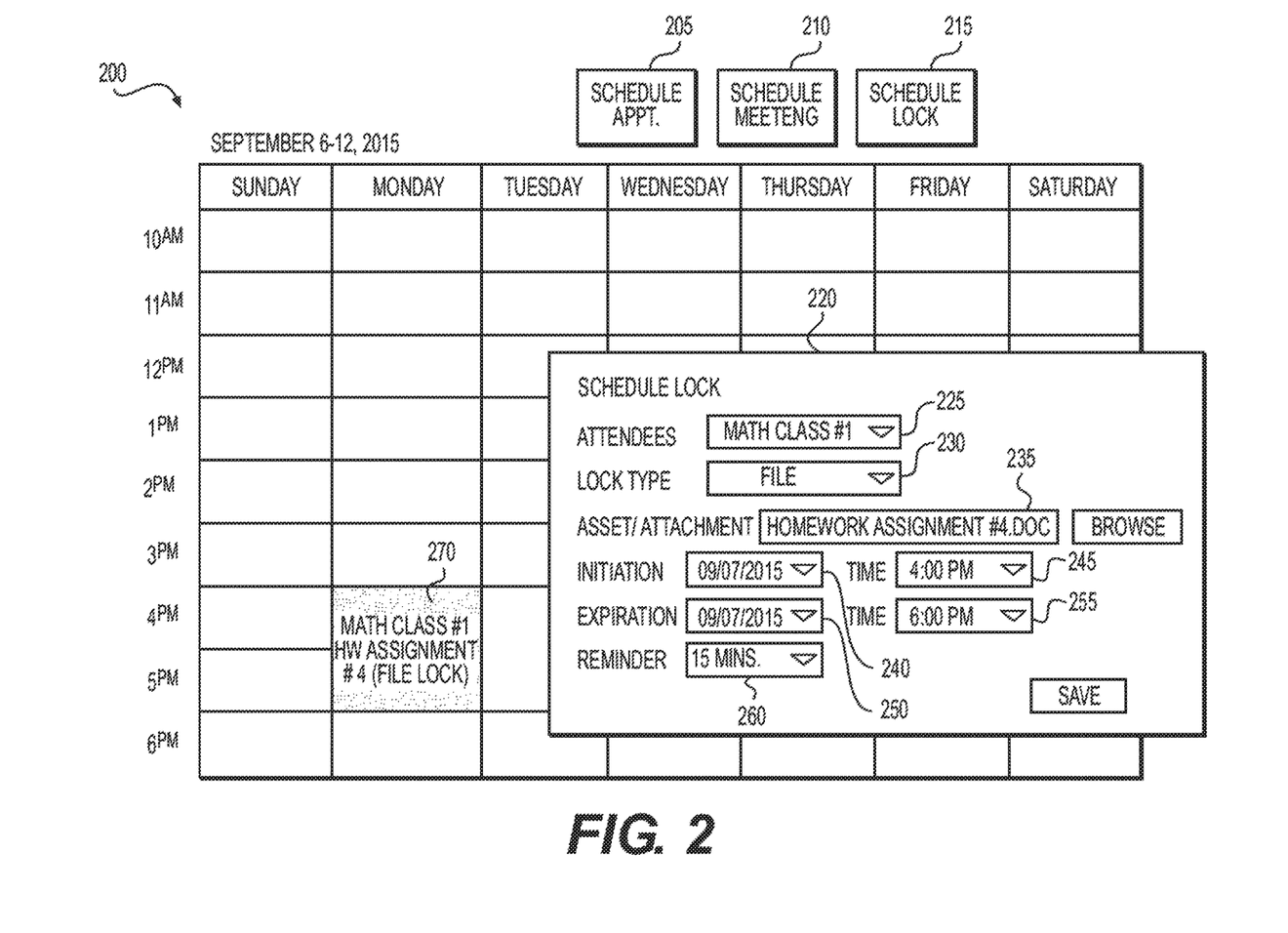
FIG. 2 is an illustrative system for scheduling locks on one or more user devices.

An example of the interface is depicted in FIG. 2. In one example, interface 200 can be displayed on teacher device 110. Interface 200 depicts a calendar view for displaying upcoming events. A user, such as a teacher, can schedule events to be displayed in the calendar by selecting a button associated with an event type, including an appointment button 205, a meeting button 210, and a lock button 215.

Upon receiving a selection of lock button 215, a lock configuration screen 220 can be displayed. The user can enter attendee information at field 225, a lock type at field 230, asset information at field 235, and lock timing information at fields 240 and 255.

Attendee information can include one or more student names, student email addresses or contact information, or group aliases including multiple students. The attendee information can be stored locally at teacher device 110, stored and retrieved from management server 130, or stored and retrieved from elsewhere.

The lock type can be selected from one of an application lock, a file lock, a web lock, or a lock profile with a combination of those lock types. Regardless of the lock type, the user can then provide asset information to be associated with the lock request at field 235. The asset can be selected from information stored locally at teacher device 110, stored at management server 130, or stored elsewhere. In the example depicted in FIG. 2, the user has selected a file lock type and associated the lock request with a homework assignment document.

The user can also select a lock initiation date and time at fields 240 and 245, respectively. In another example, where the user selects a "dynamic" option at field 240, indicative of a lock with an initiation window during which a student can initiate the lock at student device 120, the user can select a date and time range (e.g., Sep. 7, 2015, 9:00 am-Sep. 9, 2015, 5:00 pm) during which an attendee can initiate the lock.

Similarly, the user can select a lock expiration date and time at fields 250 and 255, respectively. In other examples, the user can select a "timer" option at field 250 and be afforded an opportunity enter an amount of time or duration at field 255, such as 30 minutes or 2 hours. Alternatively, the user can select an "event trigger" option at field 250. The user can then provide one or more trigger events that would cause lock expiration. Examples of trigger events can include completion of assignment or test, saving and submittal of the asset, and viewing a final frame, page, or slide of an asset. Lock configuration screen 220 can also afford the user an opportunity to combine lock initiation and expiration criteria. For example, the user can configure a dynamic lock that can be opened during a window, but student device 120 will automatically lock on the associated asset no later than 30 minutes before expiration of the dynamic lock window. Or the user can configure a lock to expire upon the earlier of a trigger event and an expiration date and time.

Lock configuration screen 220 can also provide a reminder field 260 in which the user can specify an amount of time preceding lock initiation at which a lock reminder can be activated at student device 120. For example, where a user configures a lock reminder at 15 minutes prior to lock initiation, student devices 120 associated with the attendees can activate a visual, audio, or haptic alert 15 minutes before lock initiation.

Upon finalizing the lock configuration, a corresponding lock event 270 can be displayed in the user's calendar indicating a date and time corresponding to lock duration and conveying lock information. This can allow a user to quickly view all upcoming locks at a glance. Lock event 270 can also be manipulated and any manipulations can result in an updated lock request being generated and the pre-existing lock request being canceled. For example, lock event 270 can be dragged to a different day lock event 270 can be lengthened or shortened to alter the duration of the scheduled lock. Moreover, the lock instructions transmitted from management server 130 to student devices 120 (described in more detail below) can include instructions to place a similar calendar event within a calendar application of the student devices. In this manner, a student can also quickly view all upcoming, scheduled locks at a glance or in one location.

For redundancy, teacher device 110 or management server 130 can also monitor lock events within calendar application 116 of teacher device 110. Upon commencement of a scheduled lock event, management server 130 can resend the lock instructions to student devices 120. In this manner, if a student has deleted or removed the lock instruction from a student device 120 between the time the lock instruction was initially transmitted to student device 120 and the time of lock initiation, student device 120 can still be locked.

In one example, the scheduled lock can be a recurring calendar event. The teacher can select an option on lock configuration screen 220 so that the lock will recur daily, weekly, monthly, or yearly. This can allow the teacher to schedule one or more locks that recur at particular times for a class. For example, if a class meets on Monday, Wednesday, and Thursday, the locks can be scheduled to recur each week on those days. The recurrence option can also be limited to only impact dates that a class is in session. For example, a recurring lock can be cancelled out by a holiday. Additionally, the managed application can stop creating recurring lock events at dates that exceed the end of a semester, quarter, or some other final class date. This can allow a teacher to avoid having to set the same locks multiple times for one or more classes.

Returning to FIG. 1, after configuring the lock request, teacher device 110 can send the lock request to management server 130 for transmission of lock instructions to one or more student devices 120. The lock request can contain lock information, including one or more student identifiers, one or more student device identifiers, a lock type selection, an asset associated with the lock type, or lock timing information. In some examples, where management server 130 stores copies of assets locally, the lock request can contain only an asset identifier rather than a copy of the asset. Reducing the size of the lock request transmission can preserve network resources and expedite transmissions.

The lock request can be transmitted to management server 130 as a single message or it can be transmitted as a series of messages, each containing a portion of the lock information. Alternatively, each message in a series can correspond to one or more student devices 120.

The lock request can contain information identifying the student devices associated with one or more students (or a group of students). Alternatively, the lock request can contain information identifying one or more students (or a group of students) and management server 130 can query a database to identify student devices 120 associated with each of the one or more students. The lock request can also include timing information that is stored at management server 130. Management server 130 can then transmit a message to each of student devices 120. Receipt of this message can cause each student device to check with management server 130 to retrieve or download information associated with a lock instruction. Management server 130 can then transmit the lock instructions to the respective student device 120. In one example, management server 130 can transmit a recurring lock instruction that student device 120 can schedule to recur based on the timing information. Student devices 120 can respond to management server 130 to confirm that the lock instruction has been received and, in some examples, accepted by a user.

The database utilized by management server 130 can include one or more software or hardware components that cooperate to store, organize, sort, filter, or arrange data used by system 100 and at least one processor on management server 130. In one example, the database(s) can include any information helpful in identifying the sender of a lock request, the recipients of a lock instruction, or any content associated with lock information. For instance, the database(s) can store user account information, class information, teacher-teacher device associations, teacher-class associations, student-class associations, student-student device associations, student contact information, device settings, and other user preferences or restrictions. In a further example, the database can include one more tables that store learning session-class associations, learning session descriptions, or historical lock information associated with one or more teachers, students, classes, or learning sessions. The database(s) can also contain copies of assets associated with lock information.

Management server 130 can include one or more servers. For example, management server 130 can include multiple servers, each of which is located at a different location or each of which is responsible for sending messages to a subset or all of student devices 120. Management server 130 can also include one or more messaging servers, each messaging server dedicated to communicating with a type of student device, such as those running a particular operating system.

The lock instruction transmitted to each student device 120 can include lock information, including a class identifier, a teacher identifier, a learning session identifier, a lock type identifier, lock timing information, or a copy of an asset associated with the lock. In some examples, where student device 120 can store copies of assets locally, the lock instruction can contain an asset identifier rather than a copy of the asset. Student device 120 can retrieve a locally stored copy of the asset based on the asset identifier or, if the asset associated with the asset identifier is not stored locally at student device 120, device 120 can transmit a request to retrieve a copy of the asset to management server 130.

To facilitate the lock functionality based on the received lock instruction, student devices 120 can utilize locally-stored software, such as a management component similar to the management component described above with respect to teacher device 110. In one aspect, the lock timing information and asset can be stored locally at student device 120 such that the device can be locked into the asset even in instances when student device 120 is not connected to a network or cannot communication with management server 130 at the scheduled time for lock initiation.

Depending upon the lock type, student device 120 can be locked into one or more applications, files, or web addresses at the lock initiation time. To prevent a student from viewing the asset prior to the appointed time, access to the asset can be disabled or prevented by the management component of student device 120 before lock initiation.

In examples where a dynamic lock has been received and a student can initiate the lock within a window of time, student device 120 can present an interface or menu for receiving input from a student desiring to initiate the lock.

As discussed above, the lock can then expire at a predetermined date and time, a period of time after lock initiation, or after a particular action at student device 120 triggers lock expiration.

In some examples, and similar to before lock initiation, access to the asset can be disabled or prevented after lock expiration. For example, where the asset is a test or homework assignment, a student will be able to access or alter the asset during the lock duration but will be prevented from further viewing of the asset or making additional changes to the asset after lock expiration.

After lock expiration, student device 120 can then locally store a copy of the viewed, accessed, or updated asset. If student device 120 is connected to a network or otherwise in communication with management server 130, confirmation information can be transmitted to management server 130. Confirmation information can include lock status information, such as a confirmation that the lock was initiated, a time the lock was initiated, confirmation that the lock expired, and a time that the lock expired. Confirmation information can also include information indicating whether, or to what extent, an asset was engaged during the lock event. For example, if the asset is a slide deck or document, confirmation information can indicate which slides or pages of the asset were viewed during the lock event. If the asset is a video or audio file, confirmation information can indicate the extent to which the asset was viewed or played during the lock event.

Confirmation information can also include student or student device identifier information such that the confirmation information can be associated with a particular student or student device. Student device 120 can also transmit a copy of an updated asset to management server 130. For example, where the asset was a homework assignment or test in which the student entered answers during the lock period, the altered or updated document can be transmitted to management server 130.

Where student device 120 is not connected to a network or otherwise in communication with management server 130 at the time of lock expiration, student device or its management component can monitor device connectivity and upon detecting a network connection, student device 120 can transmit the stored confirmation information or updated asset to management server 130.

Teacher device 110 can then retrieve any confirmation information or updated assets from management server 130, along with associated student or student device identifying information. For example, a teacher using teacher device 110 can retrieve copies of all tests taken during the lock event by the students or attendees associated with the lock. The teacher can also retrieve any confirmation information.

The updated assets or confirmation information can provide an indication as to whether, or to what extent, each student or attendee participated in the lock event. For example, if confirmation information indicates that a lock at a particular student device was unsuccessful, the teacher could mark the student "absent" for the lock event or could follow-up with the student regarding the lock failure.

If the confirmation information indicates that a lock at a particular student device 120 was successful, but an asset returned to management component 130 by the student device is unaltered from its original form or confirmation information indicates that only a small portion of the asset was engaged or viewed by the student during the lock event, a teacher can infer that the student associated with the student device did not participate in the lock event.

Figure 3:
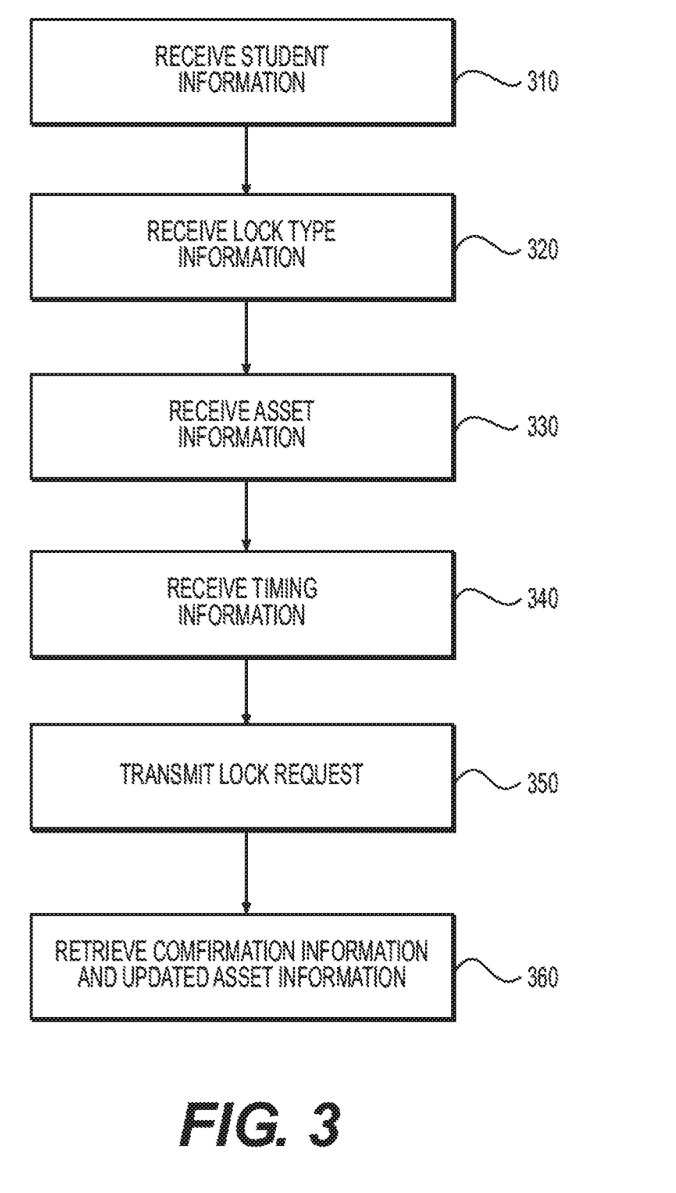
FIG. 3 is an illustrative flow chart with example stages for configuring a lock.

FIG. 3 depicts illustrative stages performed at a teacher device 110. At stage 310, teacher device 110 can receive information identifying one or more students or groups of students. The student identifying information can be in the form of student names, student email addresses, student identifiers, student device identifiers, or group aliases. Management server 130, upon receiving a lock request from teacher device 110 containing the identifying information, can access one or more databases to locate contact information for each student device 120 associated with the identifying information.

Teacher device 110 can then receive lock type information at stage 320. As discussed previously, a lock type can include an application lock, a web lock, a file lock, or a lock profile that combines two or more other lock types.

At stage 330, teacher device 110 can receive information identifying an asset to be associated with the lock request. Receipt of an asset selection can be performed in conjunction with displaying, at teacher device 110, a list of one or more available assets. The available assets displayed at teacher device 110 can be impacted by the lock type selection received at stage 320. For example, for an application lock, teacher device 110 can display a list of applications that student devices 120 can be locked into. For a web lock, teacher device 110 can display a list of websites that student devices 120 can access. For a file lock, teacher device 110 can display a list of files or documents student devices 120 can access. These lists can be downloaded from the management server 130 in one example, either beforehand or contemporaneously with the selection. Alternatively, the lists can include content stored locally at teacher device 110.

Teacher device 110 can receive lock timing information at stage 340. In one example, teacher device 110 can receive date and time information associated with lock initiation and lock expiration. In other examples, teacher device 110 can receive date and time information associated with lock initiation, but can then receive lock duration information or timer information, such as 30 minutes or one hour, associated with lock expiration. In another example, teacher device 110 can receive a window of time within which a lock can be initiated. The window can span any suitable amount of time, such as minutes, hours, or days. Where a window of time is received for lock initiation, lock expiration information received at teacher device 110 can indicate that the lock will expire at the close of the window. Alternatively, teacher device 110 can receive lock duration information or time information, as described above.

Rather than receiving a lock expiration date and time or lock duration or timer information, in any of the examples described above, teacher device 110 can receive lock expiration trigger information. Lock expiration trigger information can indicate an event or action to be performed at a student device 120 that, once performed, causes the lock to expire. For example, teacher device 110 can receive lock expiration trigger information indicating that the lock will expire upon a student device 120 receiving a "finished," "saved," or "submit" command. In other examples, lock expiration trigger information received at teacher device 110 can indicate that the lock will expire upon a student device 120 displaying or playing back all or a portion of an asset associated with the lock.

At stage 350, the lock request information, including the student identifying information, the lock type information, the asset information, and the lock timing information, can be transmitted to management server 130. Management server 130 can transmit lock instructions, based on the lock request information, to each student device 120 associated with the lock request. Upon lock expiration, management server 130 can then retrieve or receive confirmation information or updated asset information (both described above) from student devices 120.

Teacher device 110 can then retrieve or receive the confirmation information or updated asset information from management server 130 at stage 360. The confirmation information or updated asset information can be displayed at teacher device 110 to a teacher who can assess the attendance, performance, or participation of the students associated with student devices 120 based on the displayed information.

Figure 4:
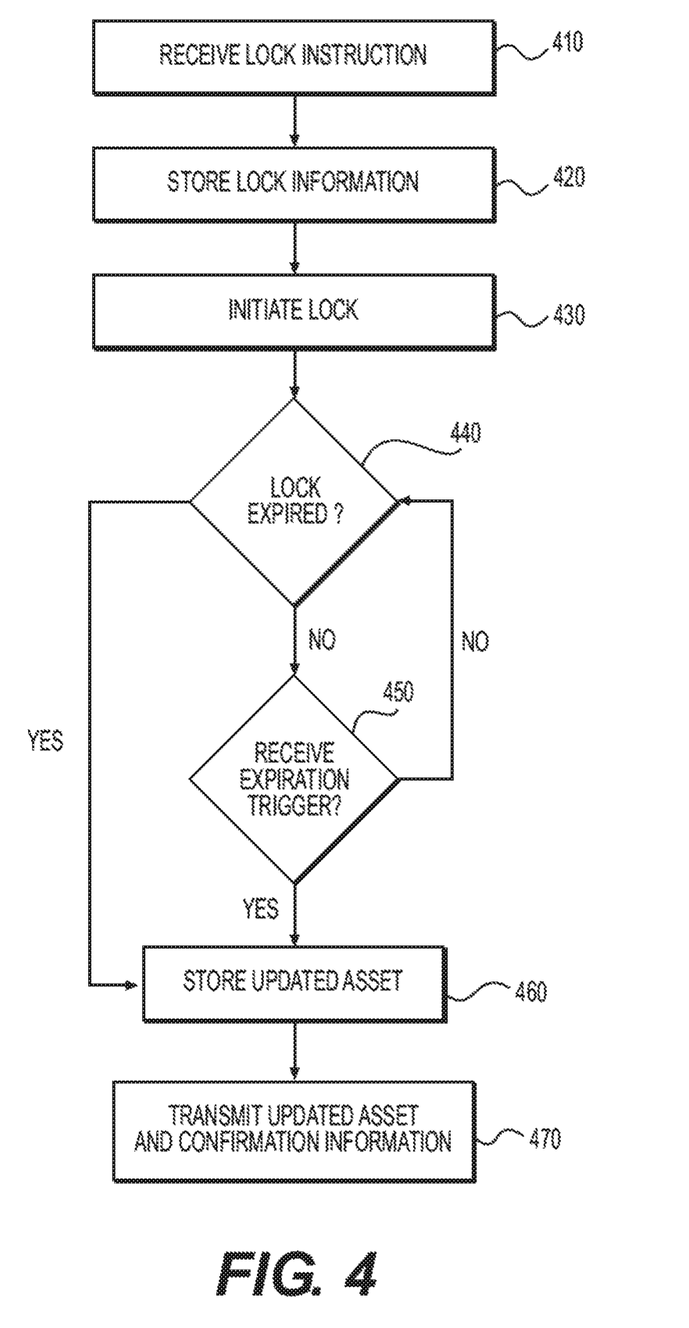
FIG. 4 is an illustrative flow chart with example stages for managing a lock instruction.

FIG. 4 depicts illustrative stages performed at a student device 120 upon receiving a lock instruction from management server 130. At stage 410, the lock instruction, including lock type information, asset information, and lock timing information, can be received at student device 120. At stage 420, a portion or all of the information contained in the lock instruction can be stored locally at student device 120 for execution in conjunction with a management component (described above) of student device 120. For example, lock type and timing information can be stored locally at student device 120 such that the lock can be initiated and expire at student device 120 even if the device is not connected to a network or in communication with management server 130 at lock initiation.

Asset information can, in some examples, include a copy of the asset for local storage at student device 120. Alternatively, a copy of the asset can already reside at student device 120 and asset information contained in the lock instruction can be used by student device 120 to locate the corresponding copy of the asset for use in conjunction with the lock. In other examples, access to the asset at student device 120 can be denied until initiation of the lock. Thus, a student operating student device 120 can be prevented from gaining access to an asset such as a test or homework assignment prior to a date and time appointed by a teacher.

At stage 430, student device 120 can initiate the lock at a predetermined time based on the timing information in the lock instruction. Depending upon the lock type, student device 120 can be locked into one or more applications, websites, or files. For example, where a teacher has scheduled a file lock to lock students into a test document, student device 120 can be locked into the test document and a student can review the document and enter answers or other information. Other functionality of student device 120, however, can be fully or partially disabled. For instance, while student device 120 is locked into the test document, access to an email or web application can be denied.

In other examples, the lock instruction can include a window or time period in which a student can elect to initiate the lock. The student can initiate the lock at a convenient time within the window, but can be barred from initiating the lock outside of the window. Student device 120 can also initiate the lock some predetermined amount of time before expiration of the window if the student has not already initiated the lock. For example, lock information can include a two-day window in which a student can lock student device 120 into a homework assignment, but student device 120 can automatically lock into the homework assignment two hours before expiration of the window to ensure the student has adequate time to complete the assignment.

Because the lock instruction can be stored locally at student device 120, the lock can initiate even when student device 120 is no longer connected to a network or otherwise in communication with management server 130. In examples where student device 120 is connected to a network and management server 130, management server 130 can communicate with student device 120 to confirm that the lock has been initiated as scheduled. If management server 130 determines that student device 120 is not locked, management server 130 can transmit another lock instruction to student device 120 to lock the student device in accordance with the lock information.

At stage 440, student device 120 can determine if the lock has expired. Where lock information contains a date and time for lock expiration, the lock can expire at that date and time. Alternatively, where lock information contains a timer or a predetermined lock duration, such as 30 minutes or two hours, the lock can expire after that amount of time.

The lock can also expire prior to a predetermined date and time or lock duration at stage 450. In some examples, the lock information can include a trigger event that can cause lock expiration. For example, a student completing a final question in a test document or clicking "save," "finished," or "submit" can cause the lock to expire.

Upon lock expiration, student device 120 can store an updated or altered asset at stage 460. For instance, if student device 120 was locked into a test or homework document in which the student was able to enter information during the lock period, student device 120 can save a local copy of the updated or altered document that includes the information provided by the student. In addition to the updated asset, student device 120 can store lock status or confirmation information. Lock status information can include confirmation that the lock initiated and expired as scheduled or without error. The status information can also include timing information about when the lock was initiated and when the lock expired. In other examples, the status information can also include information indicating what portions of an asset were accessed by a student or how long a student spent working in each portion of the assets. By monitoring inputs, such as keystrokes or button selections, status information can include information regarding any periods of inactivity by the student during the lock period. The status information, in addition to the updated asset, can help a teacher assess a student's performance and participation with respect to an asset, even in situations where the student participated away from the teacher's supervision or at a time when no network connection was available.

At stage 470, when student device 120 is connected to a network, student device 120 can transmit a copy of the updated asset to management server 130. If student device 120 was connected to a network at the time of lock expiration, transmission of the updated asset can occur immediately or shortly after lock expiration. If student device 120 was not connected to a network at lock expiration, transmission of the updated asset can occur at a later time when a network connection is detected. A teacher can then access the updated asset stored at management server 130 using teacher device 110 or another network-connected device.

Figure 5:
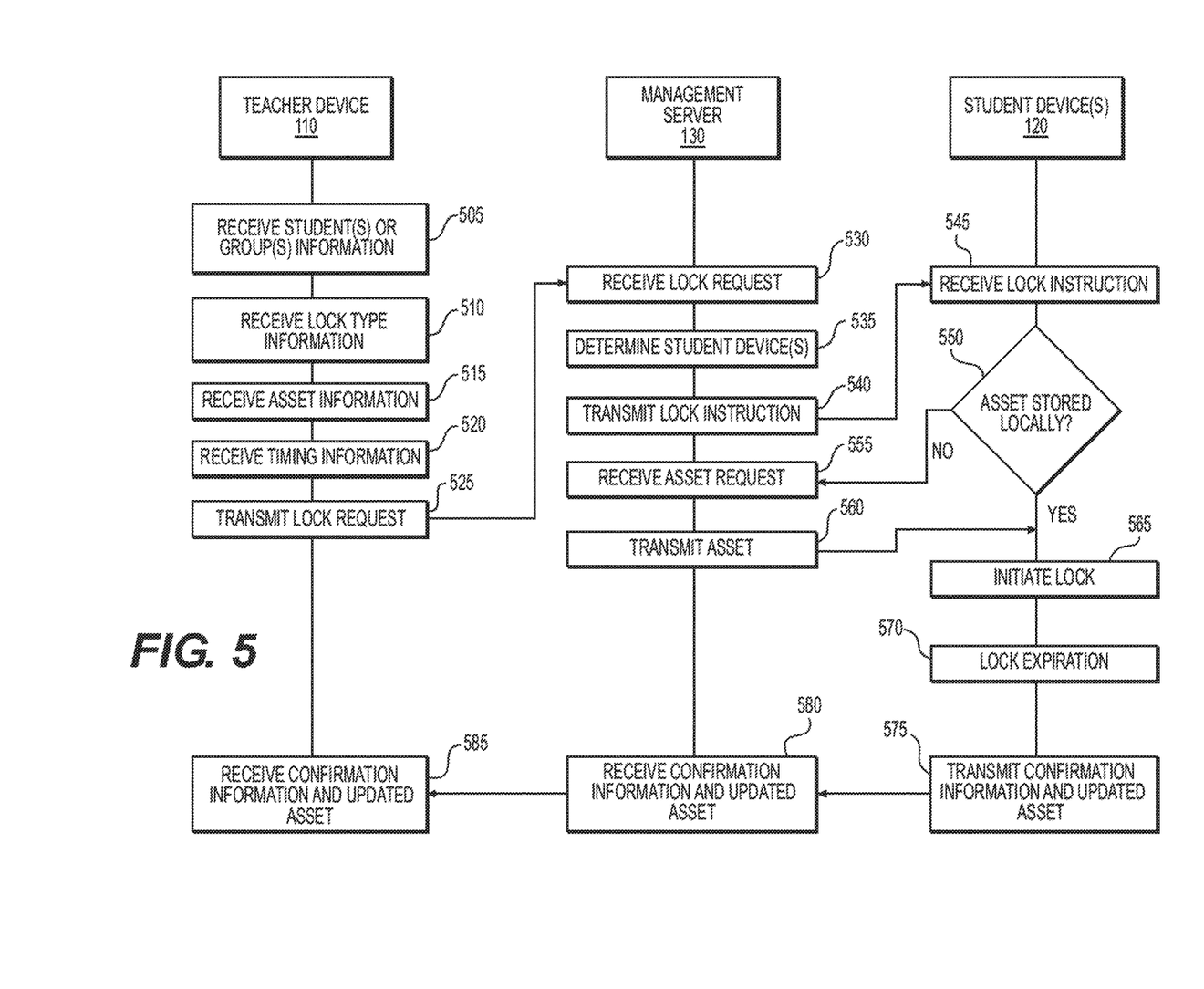
FIG. 5 is an illustrative flow chart with example stages for managing one or more user devices.

FIG. 5 is an illustrative method of scheduling a lock and retrieving an updated asset upon lock expiration. At stages 505, 510, 515, and 520, teacher device 110 can receive lock configuration information, including one or more students or student groups to which the lock will apply, a lock type selection, one or more assets associated with the lock, and lock timing information. Further details regarding the lock configuration information is discussed above with respect to FIGS. 1-3. Upon completing lock configuration, teacher device 110 can transmit a lock request including the lock configuration information to management server 130 at stage 525.

At stage 530, management server 130 can receive the lock request. Based on the lock configuration information in the request, management server can identify one or more student devices to which a lock instruction should be sent at stage 535. In one example, the lock request received from teacher device 110 can include student device identifiers. In other examples, management server 130 can identify one or more student devices 120 based on other student identifier information contained in the lock request. For instance, management server 130 can access a database that stores associations between student device identifiers and student names, emails, group aliases, or other identifiers.

Upon determining which student devices 120 are to receive a lock instruction, management server 130 can transmit a lock instruction to those student devices at stage 540. The lock instruction can contain lock type information, asset information, and timing information. The asset information can be a copy of the asset or it can be an asset identifier intended to help student device 120 locate a locally stored copy of the asset.

Student device(s) 120 receive the lock instruction at stage 545. In examples where the lock instruction contains an asset identifier rather than a copy of the asset, student device 120 can determine if a locally stored copy of the asset is available at stage 550. If a copy of the asset is not available, then student device 120 can transmit a request for the asset to management server 130 at stage 555. Management server 130 can then transmit a copy of the asset to student device 120 at stage 560. The asset can be encrypted, and management software on student device 120 can also receive and store a decryption key in a manner that is accessible to a user (e.g., in a keychain). The asset can be automatically decrypted by the student device when the lock initiates.

At stage 565, a lock can be initiated at student device 120 based on the timing information in the lock instruction. Alternatively, in instances where the lock instruction included a dynamic lock (as described above), a period or window of time can open in which a student operating student device 120 can initiate the lock. Because student device 120 previously received and stored the lock type information, asset information, and timing information, student device 120 can initiate the lock and present the asset even when student device 120 is not connected to a network or is otherwise not in communication with management server 130 at the time of lock initiation. During lock duration, the student can engage the asset but can be otherwise prevented from accessing other features of student device 120. For example, where the asset is a test or homework document, a student can enter answers or responses into the document, but can be prevented from accessing the web browser or messaging applications of student device 120.

At stage 570, the lock can expire. Lock expiration timing, duration, and conditions can vary depending upon the timing information contained in the lock request or lock instruction. Further details regarding lock expiration are discussed above with respect to FIGS. 1 and 4.

Upon lock expiration, student device 120 can store confirmation information associated with the lock at stage 575. Confirmation information can include information indicating that the lock was successfully initiated, when the lock was initiated, that lock initiation failed, lock duration, or when the lock expired. Confirmation information can also include information indicating a student's engagement of the asset associated with the lock. For example, confirmation information can include information indicating when, how frequently, or to what extent a student engaged the asset or whether the student engaged any or all portions of an asset. Further details regarding confirmation information are discussed above.

Student device 120 can also store an updated or altered asset. For example, where the asset is a test or homework document and a student enters answers or other information into the document during the lock, an updated document including the student's answers can be stored locally at student device 120.

The confirmation information and updated asset can be transmitted from student device 120 to management server 130 at stage 580. In instances where student device 120 is not connected to a network or management server 130 at the time of lock expiration, student device 120 can monitor network connectivity and transmit the confirmation information and updated asset when a network connection is established. Similar to the time prior to lock initiation, a student operating student device 120 can be prevented from further accessing the asset or updated asset after lock expiration by using encryption or deleting a locally stored copy of the asset.

At stage 585, teacher device 110 can receive confirmation information and an updated asset from management server 130. In other examples, teacher device 110 can receive the confirmation information or updated asset directly from student device 120.

A teacher operating teacher device 110 can evaluate a student's attendance with respect to a locked activity, participation in the locked activity, and performance with respect to the locked activity based at least on the confirmation information or updated asset.

While a number of examples have been illustrated and described, it will be appreciated that various changes can be made without departing from the spirit and scope of the disclosure. For instance, although the aforementioned systems and methods have been described in an educational setting, alternative systems and methods can be employed in other environments or contexts, such as a workplace environment where employers or supervisors schedule locks on employee or personnel devices to assess engagement, participation, or performance in conjunction with a locked asset.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A system comprising:
   at least one processor; and
   at least one non-transitory computer-readable medium including instructions, which when executed by the at least one processor, cause the at least one processor to perform stages including:
      executing a calendar application for scheduling future events;
      receiving, at the calendar application, a lock request to schedule a lock to be applied to at least one user device, the lock request including at least one user identifier identifying the at least one user device, an asset identifier, and timing information, the lock request identifying a function of the at least one user device to disable while the at least one user device is locked into an asset associated with the asset identifier; and
      transmitting the lock request to a management server causing the at least one user device to be locked into the asset associated with the asset identifier for a duration, the duration being based, at least in part, on the timing information.

2. The system of claim 1, the stages further comprising:
   displaying a lock event indicia within a calendar of the calendar application, the indicia indicating at least a date and time of lock initiation.

3. The system of claim 2, wherein the lock event indicia further indicates at least a period of time corresponding to the lock duration.

4. The system of claim 3, wherein the lock event indicia can be manipulated within the calendar to alter the timing information of the lock request.

5. The system of claim 4, the stages further comprising:
   transmitting an updated request to the at least one user device, the updated request including the altered timing information.

6. The system of claim 1, wherein the lock request includes a particular date and time at which the lock will be initiated.

7. The system of claim 1, wherein the lock request includes a window of time during which the lock can be initiated at the user device.

8. A non-transitory, computer-readable medium including instructions, the instructions causing a processor to execute stages including:
   receiving lock information including at least one user identifier associated with at least one user device, an asset identifier, and timing information, the lock information identifying a function of the at least one user device to disable while the at least one user device is locked into an asset associated with the asset identifier;
   displaying, within a calendar, a scheduled lock indicia, the scheduled lock indicia appearing in the calendar at a time period corresponding with the timing information; and
   transmitting at least a portion of the lock information to a management server causing the at least one user device to be locked into the asset corresponding to the asset identifier for a duration, the duration being based, at least in part, on the timing information.

9. The non-transitory, computer-readable medium of claim 8, wherein the timing information includes a date and time for lock expiration.

10. The non-transitory, computer-readable medium of claim 8, wherein the timing information includes at least one trigger event to be received at the at least one user device that will cause the lock to expire.

11. The non-transitory, computer-readable medium of claim 8, wherein the timing information includes a period of time that the lock will be applied to the at least one user device beginning once the lock is initiated.

12. The non-transitory, computer-readable medium of claim 8, wherein manipulating the size or location of the scheduled lock indicia within the calendar alters the timing information associated with the lock information.

13. The non-transitory, computer-readable medium of claim 12, the stages further comprising:
   transmitting at least a portion of updated lock information to the at least one user device, the updated lock information including the altered timing information.

14. The non-transitory, computer-readable medium of claim 8, the stages further comprising:
   displaying, within the calendar, a plurality of lock indicia each corresponding to a unique lock event, the plurality of lock indicia including the scheduled lock indicia.

15. A method comprising:
   receiving lock information including at least one user identifier associated with at least one user device, an asset identifier, and timing information, the lock information identifying a function of the at least one user device to disable while the at least one user device is locked into an asset associated with the asset identifier;

displaying, within a calendar, a scheduled lock indicia, the scheduled lock indicia appearing in the calendar at a time period corresponding with the timing information;

transmitting at least a portion of the lock information to a management server causing the at least one user device to store the lock information locally; and causing the at least one user device to be locked into the asset associated with the asset identifier for a period of time based, at least in part, on the timing information.

16. The method of claim 15, wherein the at least one user device is locked into the asset at a time when the at least one user device is not connected to a communication network.

17. The method of claim 16, further comprising locally storing an updated version of the asset at the at least one user device upon an expiration of the lock, the expiration of the lock being based, at least in part, on the timing information.

18. The method of claim 17, further comprising transmitting the updated asset from the at least one user device upon detecting a connection to a communication network.

19. The method of claim 15, further comprising locally storing confirmation information associated with the lock at the at least one user device.

20. The method of claim 19, wherein the confirmation information includes any one or more of:

information indicating a successful lock of the at least one user device; information indicating a failure to lock the at least one user device;

information indicating a duration of the lock applied to the at least one user device; and information indicating a user's engagement with the asset into which the at least one user device was locked.

* * * * *